SAMUEL CREIGHTON.
Improvement in Insect Destroyer.
No. 118,517. Patented Aug. 29, 1871.
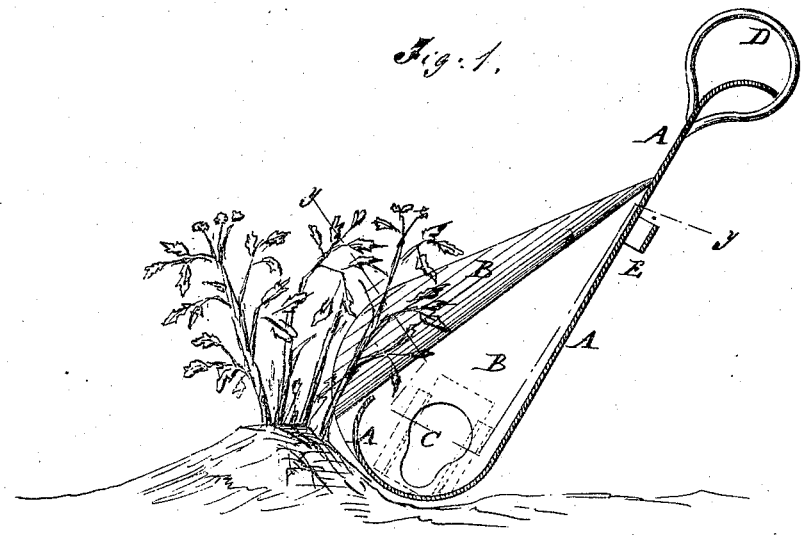
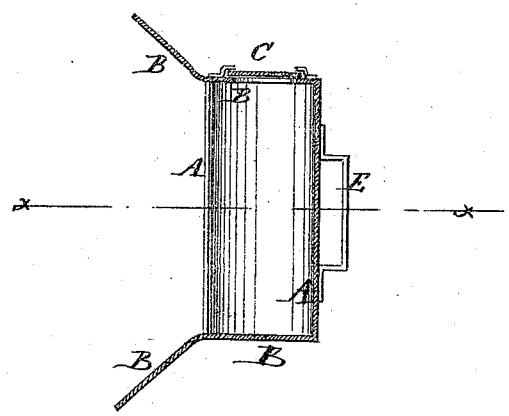

UNITED STATES PATENT OFFICE.

SAMUEL CREIGHTON, OF LITHOPOLIS, OHIO.

IMPROVEMENT IN INSECT-DESTROYERS.

Specification forming part of Letters Patent No. 118,517, dated August 29, 1871.

*To all whom it may concern:*

Be it known that I, SAMUEL CREIGHTON, of Lithopolis, in the county of Fairfield and State of Ohio, have invented a new and useful Improvement in Bug-Trap; and I do hereby declare that the following is a full, clear, and exact description thereof, which will enable others skilled in the art to make and use the same, reference being had to the accompanying drawing forming part of this specification, in which—

Figure 1 is a detail sectional view of my improved bug-trap, taken through the line $x\,x$, Fig. 2. Fig. 2 is a detail sectional view of the same taken through the line $y\,y$, Fig. 1.

Similar letters of reference indicate corresponding parts.

My invention has for its object to furnish an improved trap for removing bugs and other insects from potato vines, which shall be simple in construction, effective in operation, and convenient in use; and it consists in the trap constructed as hereinafter more fully described.

A is the back plate of the trap, the lower end of which is bent or curved into semi-cylindrical form, as shown in Fig. 1, so as to form, in connection with the side plates B, a pocket to receive the bugs. The side plates B are attached to the side edges of the plate A, and are made wide at their lower ends, and taper to a point at their upper ends, as shown in Fig. 1. The upper parts of the side plates B are bent outward, as shown in Figs. 1 and 2. In the lower part of one of the side plates B is formed an opening, closed by a slide, C, for convenience in pouring out the bugs. To the upper end of the plate A is attached a handle, D, for convenience in holding the trap when in use. Another handle, E, may be attached to the upper part of the rear side of the plate A for convenience in carrying the trap.

In using the trap it is placed at one side of the hill or hills of plants, with its top or upper end more or less inclined, according to the size of the plants. In this position the lower branches of the plants will overhang the forward edge of the plate A, and the flanges of the sides B will embrace the second and third sides of the hill, leaving the fourth side exposed. The operator then holds the trap with one hand, and with a light, flat, and broad broom he strikes the exposed side of the plants, knocking the bugs into the trap. The bugs, as they are knocked into trap, slide down the plates A B into the pocket. In the case of active bugs that might escape from the trap, water may be placed in the pocket into which they fall as they slide down the plates A B. In this case the opening should not be made in the lower part of the side plate B.

Having thus described my invention, I claim as new and desire to secure by Letters Patent—

The bug-trap A B, constructed and arranged substantially as herein shown and described, and for the purpose set forth.

SAMUEL CREIGHTON.

Witnesses:
JOHN MONHART,
J. A. FLEGEL.